United States Patent [19]
Von Kemenczky

[11] 3,954,214
[45] May 4, 1976

[54] FILM PROJECTOR
[75] Inventor: Miklos Von Kemenczky, Greenbrook, N.J.
[73] Assignee: Paul Guilden, New York, N.Y.
[22] Filed: Apr. 25, 1975
[21] Appl. No.: 571,799

[52] U.S. Cl. ............................... 226/76; 226/145; 226/156; 352/187
[51] Int. Cl.² .......................................... G03B 1/24
[58] Field of Search ............. 226/76, 79, 156, 179, 226/144, 145; 352/174, 187–190

[56] References Cited
UNITED STATES PATENTS
1,286,962  12/1918  Eaton................................. 352/187
3,281,037  10/1966  Young .............................. 226/76 X

*Primary Examiner*—Richard A. Schacher
*Attorney, Agent, or Firm*—Watson Leavenworth Kelton & Taggart

[57] ABSTRACT

The sprocket assembly for periodic advancement of film in a film projector is supported axially between rotated members and is corotative with the members upon increase in axial force therebetween. One of the members is axially restrained and the second member supported for minute axial movement. Force giving rise to the corotation of the members and sprocket assembly is applied to the second member by selective energization of an electromagnet.

26 Claims, 3 Drawing Figures

FILM PROJECTOR

FIELD OF THE INVENTION

This invention relates generally to film projectors and more particularly to apparatus for intermittently advancing film to dispose individual film frames into a registration position for projection thereof.

BACKGROUND OF THE INVENTION

Presently known arrangements providing for intermittent advance of motion picture film for projection of film frames are of mechanical variety on the one hand involving claw-type feeding mechanisms so-called maltese cross feeding mechanisms, or mechanisms of type illustrated in commonly assigned U.S. Pat. No. 3,806,246. Such known arrangements are of electromechanical variety, on the other hand, such as shown in U.S. Pat. No. 2,994,247, involving electromagnetically operated ratchet mechanisms, or in U.S. Pat. No. 1,888,094, wherein a sprocket assembly is rotated by magnetic coupling thereof to a rotatively driven selectively energized solenoid. Of such known arrangements, the structurally least complex is considered to be that of the referenced commonly-assigned application, involving axially spaced driven members continuously biased into engagement with a sprocket assembly disposed therebetween with a stop member selectively engaging the sprocket assembly to arrest its rotation.

SUMMARY OF THE INVENTION

The present invention has as its primary object an improvement of such presently known apparatus by avoidance of the need for complex mechanisms and reduction of friction losses particularly as occur in the aforesaid mechanical variety of apparatus considered least complex and by simplifying the referenced electromechanical variety.

A more particular object of the invention is to provide improvements in apparatus of the type disclosed in said commonly-assigned application for reducing friction losses between rotative members and a sprocket assembly selectively rotated therewith.

A still further object of the invention is to provide for noise reduction in film projectors.

In attaining these objects, the invention provides apparatus wherein a film advancing sprocket assembly is supported between axially spaced continuously rotated first and second members such that the members may rotate relative to the sprocket assembly during periods in which the sprocket assembly is stationary and film frames are disposed in registration position and being projected, and wherein energizable means provides for frictional engagement between the members and the sprocket assembly of magnitude giving rise to corotation of the sprocket assembly therewith selectively during periods in which the film is to be advanced.

The foregoing and other objects and features of the invention will be evident from the following detailed description of preferred embodiments thereof and from the drawings wherein like reference numerals identify like parts throughout.

BRIEF DESCRIPTION OF THE DRAWINGS

FIG. 3 is a circuit diagram for the translator controller of FIGS. 1 and 2.

DETAILED DESCRIPTION OF PREFERRED EMBODIMENTS

Figure 1:
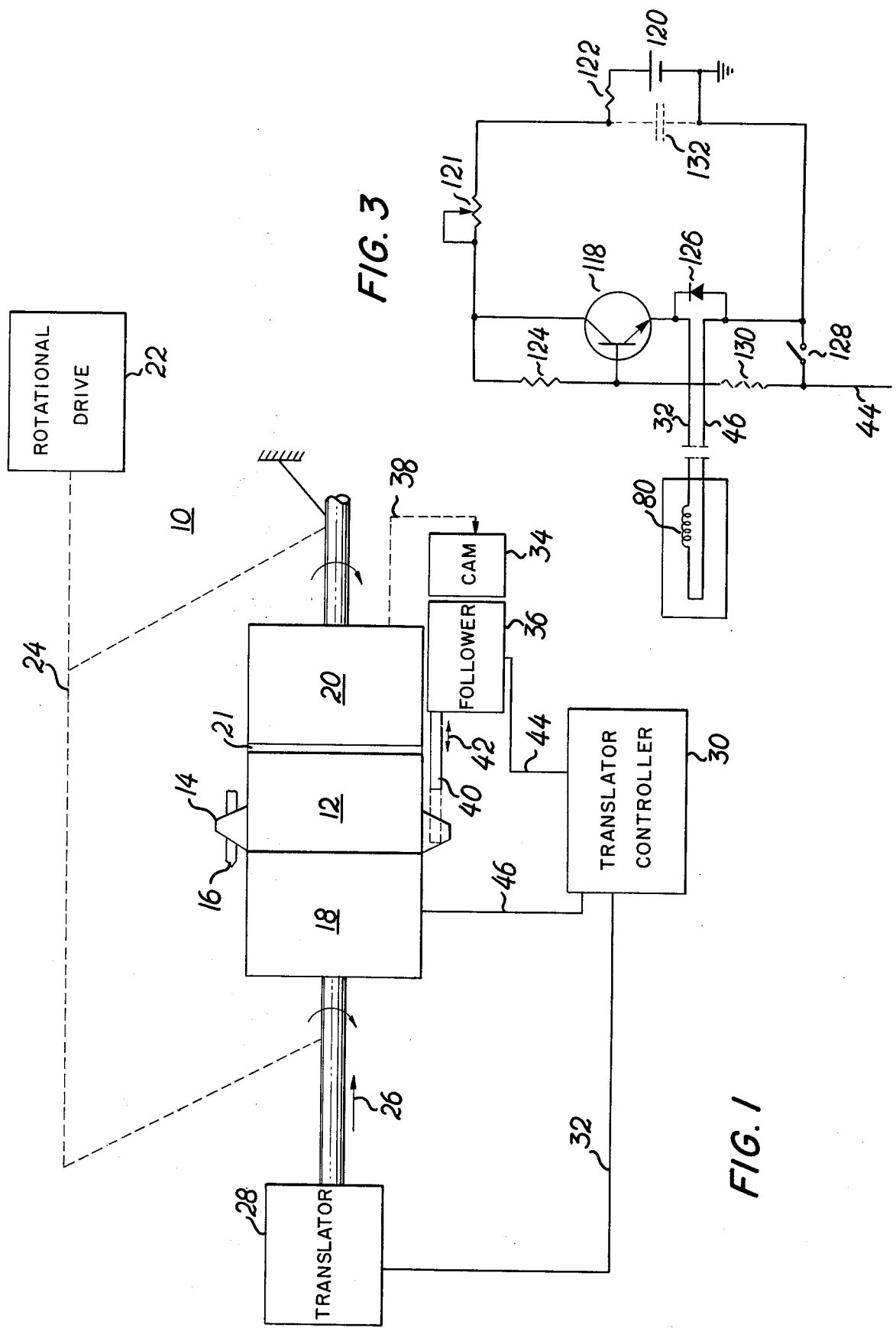
FIG. 1 is a block diagram of film projector apparatus in accordance with the invention.

Referring to FIG. 1, film projector apparatus 10 includes sprocket assembly 12 having peripheral teeth 14, enterable in drive slots in film 16 for transporting frames thereof into an optical projecting system (not shown). Sprocket assembly 12 is supported for rotation about an axis about which first and second opposed members 18 and 20 are also supported for rotation. Members 18 and 20 are connected to rotary drive 22 by linkage 24 and are rotated continuously thereby during projector use at common rotational speed with like rotative sense. Member 20 is restrained against axial, i.e., translational or left-right movement in FIG. 1, as indicated by fixed axial arrangement thereof with respect to the projector housing. A friction plate 21 is disposed between member 20 and sprocket assembly 12. Member 18, on the other hand, is supported in projector apparatus 10 in axially unrestrained manner and, under direction of translator 28, has axial force applied thereto as indicated by arrow 26.

When translator 28 is energized by translator controller 30 through line 32, member 18 applies such axial force to sprocket assembly 12 whereby the same is frictionally engaged between member 18 and plate 21 and rotates therewith. Other than during such periods of energization of controller 30, member 18 and plate 21 do not frictionally engage sprocket assembly 12 in a manner imparting corotation thereto, but rotate relative to the then restrained sprocket assembly 12, and a film frame is accordingly then fixedly stationed in the optical projecting system.

Member 20 serves as a rotative drive source for cam 34 and follower 36 as indicated schematically in FIG. 1 by fixed connection 38 between member 20 and cam 34. Follower 36 supports a rigid stop element 40 for cyclic axial reciprocating movement, as indicated by arrow 42 in FIG. 1, in accordance with the angular position of member 20. Stop element 40 is thus cyclically displaceable upon continuous rotation of member 20 from a first position (FIG. 1 solid line showing) to a second position (FIG. 1 broken line showing). In such second position, element 40 is situated in the rotative path of movement of sprocket teeth 14. Element 40 and sprocket assembly 12 may be electrically conductive, and electrical connection made to element 40 through follower 36 by line 44. Electrical connection may be made to sprocket 12 by line 46 through member 18, which engages sprocket assembly 12. With this arrangement, controller 30 energizes translator 28 upon non-engagement of sprocket teeth 14 and element 40, i.e., upon electrical non-conductivity between lines 44 and 46, whereby sprocket assembly 12 is rotated, advancing film 16. Upon engagement of element 40 and one of sprocket teeth 14, electrical conductivity is provided between lines 44 and 46 and controller 30 is responsive to this condition, in one embodiment of the invention, to deenergize translator 28. In another embodiment, the translator is energized by an electrical impulse expiring before such engagement.

Figure 2:
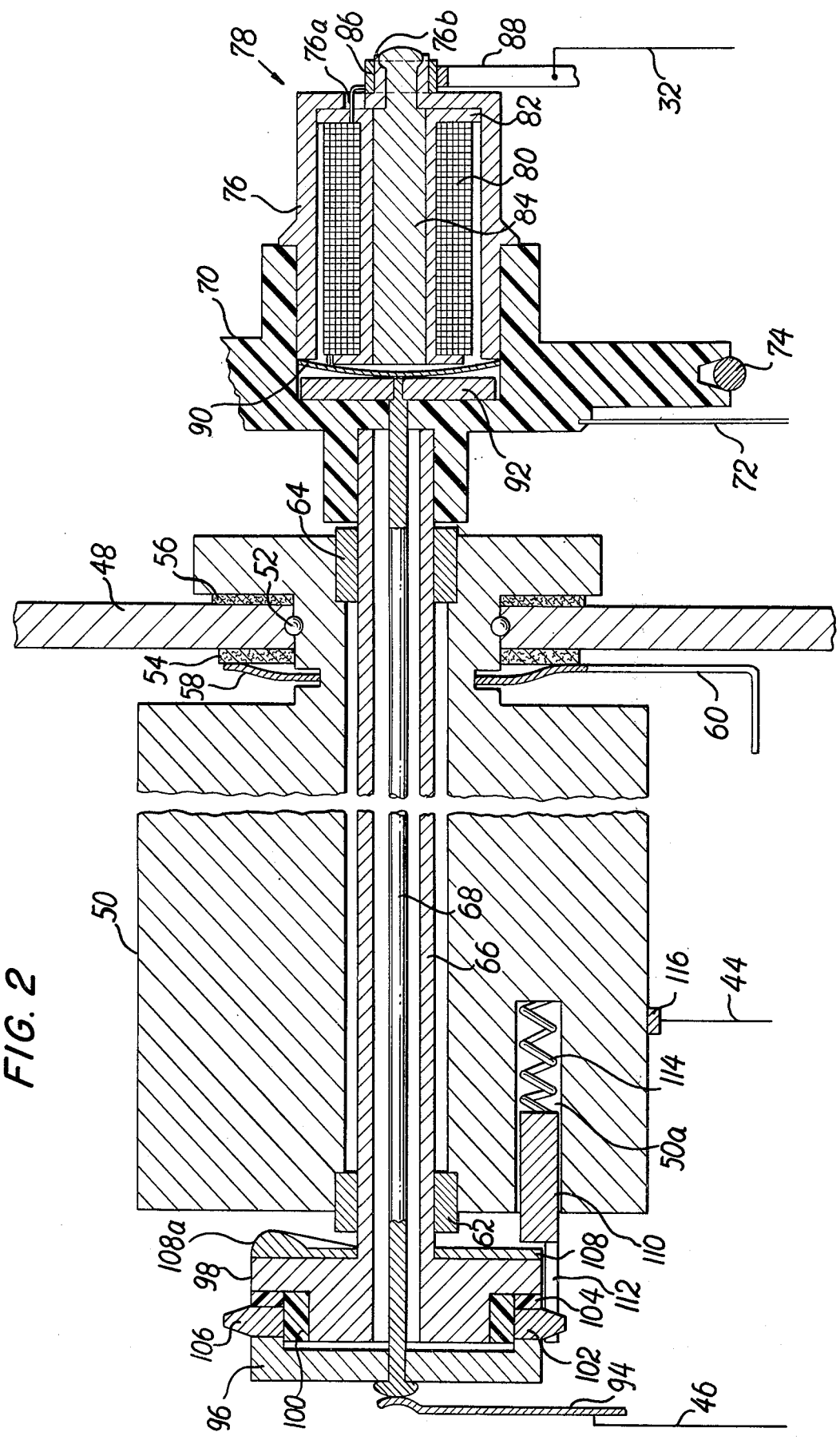
FIG. 2 is a side elevation in section of the particularly preferred embodiment of an assembly of parts useful in implementing the FIG. 1 block diagram.

Referring now to the assembly of parts in FIG. 2, upright wall 48 is rigidly supported and has an opening in which is seated cylindrical housing 50. Resilient ring 52 encircles a portion of housing 14 extending through such wall 48 opening and vibration absorbing pads 54 and 56, e.g., of felt or the like, encircle portions of housing 50 immediately adjacent opposite sides of wall 48. Spring member 58 engages housing 50 and pad 54, effective to provide for secure support of housing 50 by wall 48. Spring member 58 is preferably in the form of a fork having handle 60, movement of the handle inwardly or outwardly of the plane of FIG. 1 enabling selective rotative positioning of housing 50 relative to wall 48 for framing.

Housing 50 defines a central axial bore therethrough, opposite ends of which support bushings 62 and 64, which in turn provide rotative support for shaft 66. Shaft 66 also defines a central axial bore therethrough in which is disposed shaft 68.

At one end thereof shaft 66 is secured to the hub of pulley 70 such that the shaft and pulley are corotative. Pulley 70, comprised of electrically insulative material, supports customary shutter disc 72 and is rotatively driven by drive means including belt 74 continuously driven during use of the projector.

Pulley 70 supports mantle 76 of electromagnet assembly 78, the mantle being secured to pulley 70 for corotation therewith. Electromagnet solenoid 80 is fixedly supported by spool 82, in turn secured to core 84. Mantle extension 76b is secured to core 84, whereby the core, spool 82 and solenoid 80 are corotative with the mantle. One coil end of solenoid 80 is led through an opening 76a in mantle 76 and is connected to slip ring 86 which is secured to extension 76b of mantle 76. Electrical slip contact 88 engages slip ring 86.

Immediately leftwardly of electromagnet assembly 78, pulley 70 supports an elastic plate 90, comprised of electrically conductive material, e.g., bronze, to which is connected the remaining coil end of solenoid 80. Plate 90 is biased into engagement with the end of shaft 68 extending interiorly of pulley 70. This end of shaft 68 supports, in the magnetic field of influence of electromagnet assembly 78, disc 92 which is comprised of magnetically-attractable material. At its other end, shaft 68 supports member 96 for corotation therewith, this shaft 68 end being engaged by slip contact 94. As indicated, member 96 is preferably integral with shaft 68. At its leftward end, shaft 66 supports member 98, also preferably an integral part of shaft 66. Member 98 includes a stepped portion on which is seated electrically insulative ring 100. Ring 100 in turn supports sprocket 102 and electrically insulative disc 104, counterpart to friction plate 21 of FIG. 1 and comprised of plastic, paper or similar sheet material having an asbestos filler and exhibiting opposed surfaces of high friction coefficient. Sprocket peripheral teeth 106 are adapted for engaging film slots.

Member 98 has rigidly secured thereto, or formed integrally therewith, cam plate 108 defining cam surface 108a. Cam follower 110 is supported in axial recess 50a of housing 50 and in turn supports stop element 112 at the leftward end thereof. Spring 114 biases follower 110 into engagement with cam surface 108a. Upon rotation of member 98 and cam plate 108, surface 108a subjects follower 110 to cyclic axial reciprocating movement from its illustrated position, wherein stop element 112 is disposed in the path of rotation of sprocket teeth 106, to a rightward position, wherein follower 110 is displaced into recess 50a and stop element 112 is situated outwardly of the path of travel of sprocket teeth 106.

Terminal 116 is provided on housing 50 for connection to line 44 and contacts 88 and 94 are connected respectively to lines 32 and 46. With elastic plate 90 and shaft 68 electrically conductive, electrical continuity exists at all times from line 32, through solenoid 80, to line 46. With member 96, sprocket 102, sprocket teeth 106, stop element 112, follower 110, spring 114 and housing 50 also electrically conductive, electrical continuity is selectively provided from line 44 to line 46, i.e., when stop element 112 engages one of sprocket teeth 106.

Referring now to FIG. 3, the circuitry thereof connected to wire connections 32, 44 and 46 implements selective energization and deenergization of solenoid 80 and hence electromagnet assembly 78 and may suitably comprise a solid state switching element, for example, transistor 118, and a voltage supply 120. The transistor base (gating electrode) is connected to line 44 and the transistor collector is connected to the positive terminal of supply 120 through variable resistor 121 and resistor 122. A resistor 124 is connected between the transistor base and collector. The transistor emitter is connected to line 32 and line 46 is connected to the negative terminal (ground) of supply 120. Safety diode 126 is connected in parallel circuit with solenoid 80 through lines 32 and 46. A manually-operable switch 128 is connected between the transistor base and the negative terminal of supply 120 to enable the user to manually stop the film for single frame viewing. Resistor 130 and capacitor 132, shown in broken lines in FIG. 3, may be employed for purposes discussed following the ensuing discussion of the circuit shown in solid lines.

In operation of the solid line FIG. 3 circuit, in the absence of the aforesaid electrical continuity between lines 44 and 46, supply 120 applies a forward bias voltage through resistor 124 to the transistor base, rendering the transistor highly conductive. Under this condition, solenoid 80 is connected through the transistor to supply 120 and is energized. Upon the occurrence of electrical continuity between lines 44 and 46, the transistor forward bias voltage is driven to zero since the transistor base is grounded. The transistor is thus rendered non-conductive and solenoid 80 deenergized. As will be noted, switch 128 is connected across lines 44 and 46 and closure of the switch is likewise effective to deenergize solenoid 80 by rendering the transistor non-conductive. Diode 126 is operative to suppress inductive kickback transient voltages otherwise introduced in the FIG. 3 circuit upon deenergization of solenoid 80.

On energization of solenoid 80, the magnetic flux issuing therefrom passes through plate 90, preferably comprised of bronze, and into magnetic attractable disc 92 whereupon rightwardly directed axial force is applied to disc 92, elastic plate 90 and shaft 68. On this occurrence, member 96 is urged in the direction of member 98, increasing the pressure applied to disc 104 between sprocket 102 and member 98 whereupon sprocket 102 and disc 104 are rotated in unison with members 96 and 98. During the course of rotation of member 98, cam surface 108a permits follower 110 to exit from recess 50a to an extent disposing stop element 112 in the path of sprocket teeth 106. On engagement of the stop element and a sprocket tooth, the aforesaid electrical continuity is provided between lines 44 and 46, deenergizing solenoid 80 if not theretofore deenergized as discussed below. On this event, the increased pressure on disc 104 is relieved. Thus, while engaged tooth 106 and hence sprocket 102 are impeded from further movement by stop element 112, members 96 and 98 rotate with respect to sprocket 102 and disc 104. As cam surface 108a again displaces follower 110 inwardly in recess 50a, stop element 112 departs from its engagement with sprocket teeth 106 and electrical continuity between lines 44 and 46 is interrupted. Solenoid 80 is thereupon reenergized and film advance again occurs until further cyclic engagement of the sprocket teeth and stop element.

In providing for variation in axial forces and consequent increases in pressure giving rise to selective corotation of sprocket 102 with members 96 and 98, structure is provided for supporting axial displacement of member 96. It is to be appreciated, however, that quite minimal and virtually immeasurable axial translation of shaft 68 and its member 96 achieves the necessary increase in pressure and mutual friction between member 96, sprocket 102, disc 104 and member 98 to provide for corotation thereof. In this connection, actual movement of member 96 may not be of extent giving rise to such axial movement of sprocket 102 as would cause lateral movement of film observable in projection thereof.

Housing 50 is of large mass and is comprised of material having low sound conductivity, for example, lead or zinc. Felt pads 50 and 56 serve to acoustically insulate housing 50 from upright wall 48 of the projector. Accordingly, housing 50 effectively absorbs the noise generated in operation of the FIG. 2 assembly, particularly the noise generated by the cyclic engagement of stop element 112 and sprocket teeth 106.

While in the foregoing discussion, solenoid 80 is alternately energized and completely deenergized whereby friction loss between the sprocket assembly and members 96 and 98 is substantially nil, the invention contemplates the allowance of some such friction loss to maintain stable angular positioning of the sprocket assembly during periods in which a film frame is being projected, i.e., by maintaining stop element 112 and the sprocket tooth thereby engaged in stable engagement.

For this purpose, the circuitry of FIG. 3 may include a low value resistor 130 shown by broken lines to be connected between the transistor base and line 44, whereby the transistor is biased to a minimal conductive state during engagement of stop element 112 and a sprocket tooth. By this arrangement, electromagnet assembly 78 exerts nominal influence on disc 92 serving to create slight pressure by member 96 on sprocket 102, whereby the engaged sprocket tooth is continually urged against stop element 112. Alternative to this electrical bias, a small spring may be included in the assembly of FIG. 2 to exert slight mechanical axial bias on shaft 68 having the same sense as the influence of the electromagnet assembly when energized.

In a further refinement of the circuit of FIG. 3 adapted to lessen noise generation in projector operation, capacitor 132 is connected to supply 120 through resistor 122 as shown. During periods in which transistor 118 is non-conductive, the capacitor charges through resistor 122 toward the terminal voltage of the supply. When the transistor is rendered conductive, the capacitor discharges through the transistor from its charged voltage level to a low voltage, with the discharge time constant being controllable by the setting of resistor 121, such that an impulse of voltage is applied to solenoid 80 providing for a high initial increase in pressure between member 96, sprocket 102, disc 104 and member 98 (FIG. 2) and subsequent lessening of such pressure to nil according with the exponential character of the capacitor discharge. By this provision, current supplied to the solenoid is gradually decreased to a point at which the solenoid is effectively deenergized before the teeth of sprocket 102 move into engagement with stop element 112. The impact therebetween accordingly occurs with substantially lessened momentum and consequent lower noise generation than that occurring without usage of capacitor 132. By appropriate setting of resistor 121, the point of effective deenergization of solenoid 80 may be readily adjusted. The variable nature of resistor 121 further serves to adapt the circuit to provide this feature with different speeds of film transport.

Various modifications and changes now made evident to those skilled in the art may be introduced in the foregoing particularly disclosed embodiments of the invention without departing from the scope thereof. Thus, the particularly disclosed embodiments are intended in a descriptive and not in a limiting sense. The true spirit and scope of the invention is set forth in the following claims.

What is claimed is:

1. In combination, in a film projector:
   a. drive means continuously operative during projector use;
   b. first and second members each connected to said drive means and rotated thereby about a common axis at common rotational speed, said first and second members being axially spaced from one another, said first member being supported for axial translation toward said second member;
   c. film advancing sprocket means supported axially between said first and second members and rotated thereby upon said axial translation of said first member;
   d. first means energizable to impart said axial translation to said first member; and
   e. second means for selectively energizing said first means.

2. The invention claimed in claim 1 wherein said sprocket means includes peripheral electrically conductive teeth enterable in drive slots in said film and wherein said second means includes an electrically conductive element cyclically movable into and out of engagement with said sprocket means teeth during rotation of said second member, said second means further including circuit means for energizing said first means upon non-engagement of said element and said sprocket means teeth.

3. The invention claimed in claim 2 wherein said first means includes electromagnet means energizable by said second means.

4. The invention claimed in claim 3 wherein said electromagnet means includes a solenoid electrically connected to said circuit means, said circuit means including a voltage supply and switch means electrically connecting said solenoid and said voltage supply.

5. The invention claimed in claim 4 wherein said switch means comprises a solid state switch having a gating electrode connected in series circuit with said sprocket means teeth and said second means electrically conductive element.

6. The invention claimed in claim 3 wherein said drive means includes a pulley supporting said electromagnet means for corotation therewith, a second shaft having one end fixedly connected to said pulley and a second end supporting said second member, said second shaft defining an axial bore therethrough, a first shaft disposed in said second shaft axial bore and having one end extending interiorly of said pulley and an opposite end supporting said first member, and resilient means in said pulley interior providing for corotation of said first shaft with said pulley and supporting axial translation of said first shaft during such corotation of said first shaft and said pulley.

7. The invention claimed in claim 6 wherein said first shaft one end supports a magnetically-attractable member in such pulley interior in the magnetic field of influence of said electromagnet means, said magnetically-attractable member being axially translated by said electromagnet means on energization thereof and axially translating said first shaft whereby said first member is axially translated toward said second member.

8. The invention claimed in claim 7 wherein said electromagnet means includes a solenoid having first and second coil ends, said first coil end being electrically connected to said resilient means, said resilient means, said first shaft, said first member and said sprocket means being electrically conductive, whereby an electrically conductive path exists between said solenoid and said first shaft and a further electrically conductive path exists between said first shaft and said second means electrically conductive element upon engagement of said sprocket means and said electrically conductive element.

9. The invention claimed in claim 8 wherein said circuit means defines three terminals electrically connected respectively to said first shaft, said second coil end of said solenoid and said second means electrically conductive element.

10. The invention claimed in claim 6 further including a sound-absorbent housing defining an axial bore therethrough and supporting said second shaft for rotation therein.

11. The invention claimed in claim 2 wherein said first means includes electromagnet means and wherein said circuit means energizes said electromagnet means upon disengagement of said element and said sprocket means teeth and deenergizes said electromagnet means prior to further engagement of said element and said sprocket means teeth.

12. The invention claimed in claim 2 wherein said first means includes electromagnet means and wherein said circuit means energizes said electromagnet means during periods of non-engagement of said element and said sprocket means teeth and deenergizes said electromagnet means during periods of engagement of said element and said sprocket means teeth.

13. The invention claimed in claim 1 wherein said sprocket means comprises a sprocket and a friction plate disposed successively axially between said first and second members, said members, said sprocket and said plate being corotative upon said translation of said first member toward said second member.

14. In combination, in a film projector:
 a. drive means comprising a pulley continuously rotated during projector use and first and second coaxial shafts corotative with said pulley at common rotational speed, said first shaft being supported for axial translation relative to said second shaft;
 b. first and second members respectively axially spacedly supported by said first and second shafts for rotation therewith;
 c. film advancing sprocket means supported axially between said first and second members and rotated thereby upon said axial translation of said first shaft;
 d. electromagnet means supported by said pulley for corotation therewith and energizable to impart said axial translation to said first shaft; and
 e. means for selectively energizing said electromagnet means.

15. The invention claimed in claim 14 wherein said sprocket means includes peripheral electrically conductive teeth enterable in drive slots in said film and wherein said means for selectively energizing said electromagnet means includes an electrically conductive element cyclically movable into engagement with said sprocket means teeth upon preselected rotation of said drive means and circuit means for energizing said electromagnet means upon non-engagement of said element and said sprocket means teeth.

16. The invention claimed in claim 15 wherein said electromagnet means includes a solenoid electrically connected to said circuit means, said circuit means including a voltage supply and switch means electrically connecting said solenoid and said voltage supply.

17. The invention claimed in claim 16 wherein said switch means comprises a solid state switch having a gating electrode connected in series circuit with said sprocket means teeth and said electrically conductive element.

18. The invention claimed in claim 15 wherein said drive means includes resilient means in said pulley providing for said corotation of said first shaft with said pulley and supporting axial translation of said first shaft during such corotation of said first shaft and said pulley.

19. The invention claimed in claim 18 wherein said first shaft supports a magnetically-attractable member in said pulley in the magnetic field of influence of said electromagnet means, said magnetically-attractable member being axially translated by said electromagnet means on energization thereof and axially translating said first shaft.

20. The invention claimed in claim 19 wherein said electromagnet means includes a solenoid having first and second coil ends, said first coil end being electrically connected to said resilient means, said resilient means, said first shaft, said first member and said sprocket means being electrically conductive, whereby an electrically conductive path exists between said solenoid and said first shaft and a further electrically conductive path exists between said first shaft and said electrically conductive element upon engagement of said sprocket means and said electrically conductive element.

21. The invention claimed in claim 20 wherein said circuit means defines three terminals electrically connected respectively to said first shaft, said second coil end of said solenoid and said electrically conductive element.

22. The invention claimed in claim 18 further including a sound-absorbent housing defining an axial bore therethrough and supporting said second drive shaft for rotation therein.

23. The invention claimed in claim 14 wherein said sprocket means comprises a sprocket and a friction plate disposed successively axially between said first and second members, said members, said sprocket and said plate being corotative upon said axial translation of said first shaft.

24. In combination, in a film projector:
 a. drive means continuously operative during projector use;
 b. first and second axially spaced members rotated by said drive means at common rotational speed;
 c. film advancing sprocket means supported axially between such first and second members and rotated thereby upon reduction of such axial spacing between said first and second members;
 d. first means energizable to reduce said axial spacing between said first and second members; and
 e. second means for selectively energizing said first means.

25. The invention claimed in claim 24 wherein said sprocket means includes peripheral electrically conductive teeth and wherein said second means includes an electrically conductive element cyclically movable into engagement with said sprocket means teeth upon preselected rotation of said second member, said second means further including circuit means for energizing said first means upon non-engagement of said element and said sprocket means teeth.

26. The invention claimed in claim 25 wherein said first means includes electromagnet means energizable by said second means.

* * * * *